Inventor
H. KANEKO
By C. H. Suydam
AGENT

March 31, 1964 HISASHI KANEKO 3,127,554

DELTA MODULATION SYSTEM

Filed June 21, 1960 2 Sheets-Sheet 2

Inventor
H. KANEKO
By C. H. Suydam
AGENT

United States Patent Office 3,127,554
Patented Mar. 31, 1964

3,127,554
DELTA MODULATION SYSTEM
Hisashi Kaneko, Tokyo, Japan, assignor to Nippon Electric Company, Limited, Tokyo, Japan, a corporation of Japan
Filed June 21, 1960, Ser. No. 37,729
6 Claims. (Cl. 332—11)

This invention relates to pulse modulation systems and more particularly to modulation systems of the type in which on-off coded pulses or presence and absence of pulses are transmitted at regularly timed intervals; the presence and absence of pulses representing increases and decreases (or positive and negative increments) in the level of the signal to be transmitted. Such a system is commonly known under the name Delta Modulation Systems.

In transmitting voice signals, telephone signals, or various other signals, the form of binary pulse code modulation is commonly used. Under such a system the signal wave is quantized at specific sampling points and the amplitude at those particular points is encoded into presence and absence of pulses. This system is extremely good from the standpoint of signal to noise ratio, because, in order to correctly reconstitute the original signal at the receiving terminal, it is sufficient only to recognize the presence and absence of pulses at every sampling time. Delta-modulation is one of the simplest types of pulse code modulation and is of the form in which a single digit pulse is used for indicating an increment of the signal change from one sampling interval to the next. In such systems then the signal is reconstituted by integrating the pulses at the receiving end. In order to determine the signal increments, there is provided a local decoder or integrator, the output of which must be compared at each sampling interval with the input signal in order to determine the incremental changes. This type of system has the advantage of being very simple, compared with the more elaborate multi-modulus or digit pulse code modulation systems.

In order to reduce the errors which may be produced by this latter type of system, it is essential that each pulse representing an increase in the signal has the same time duration and amplitude and is free from change by coded pulse sequence. In the past, rather elaborate systems for reducing the errors have been used.

It is an object of this invention to provide an encoding arrangement for obtaining a delta modulation system which is very simple and yet which is extremely stable showing excellent modulation characteristics.

According to a feature of this invention, there is provided a modulation circuit of the type in which pulses representing increases or decreases in signal level are produced. The system includes a monostable circuit, the output of which provides the coded pulses. Also coupled to this output is a decoding circuit, preferably an integrating circuit. Gating pulses and the modulating signal are superposed after passing through respective transformers and are applied over a diode to a terminal of the monostable circuit. The decoded signal is also applied over a series circuit, including the signal and gating pulse transformers and the diode. This construction makes it possible to dispense with redundant network because of a clamping and overshoot charging of the monostable circuit through the medium of the diode so as to maintain suitable triggering voltage and at the same time provide a very simple modulating circuit.

As a further feature of the invention there may be provided a parallel connected resistor and condenser in the series circuit to avoid non-linear effects being applied to the decoding circuit.

The above mentioned and other features and objects of the invention and the manner of attaining them will become more apparent and the invention itself will be best understood by reference to the following description of an embodiment of the invention taken in conjunction with the accompanying drawings, in which.

Figures 1, 2, 4A:
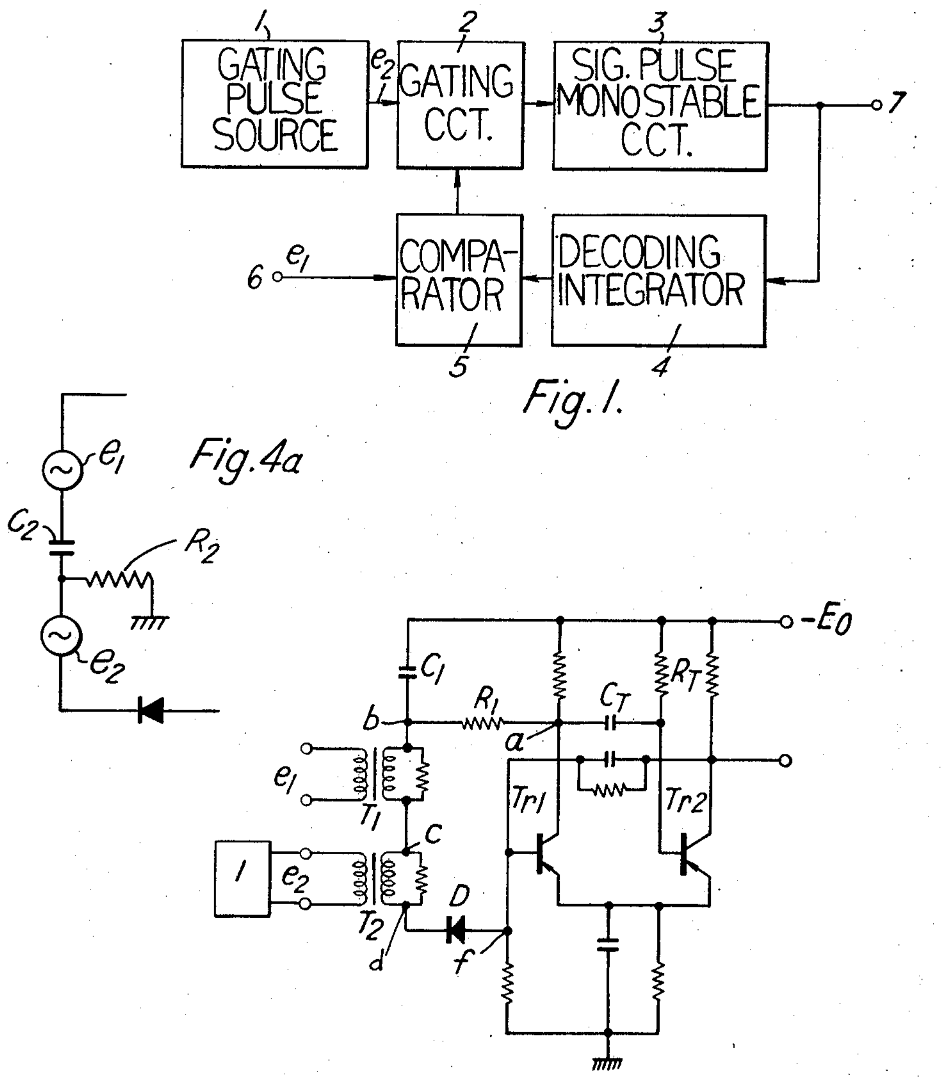
FIG. 1 shows the construction of the conventional delta modulation equipment.
FIG. 2 shows the construction of an embodiment of equipment according to the present invention.

FIG. 4*a* shows a further modification of a feature of the present invention.

FIG. 1 shows the construction of the ordinary delta modulation equipment. A pulse generator 1 produces sampling gating pulses at fixed sampling time periods. These pulses are applied to a binary shaping circuit 3 constituting an on-off element for converting the applied signals to the on-off binary code pulses supplied as output pulses to terminal 7. At the same time, the coded pulses are decoded to reconstitute the input signal by the local decoder 4. The difference between the decoded output and the input signal applied to the input terminal 6 is obtained by the comparator 5 and fed to the gating circuit 2. The output binary code is so encoded that the error between the decoded waveform and the input waveform is minimized.

Generally speaking, the local decoding network 4 is an integrating network for performing decoding by integrating the shaped pulses from 3.

The pulses are "on" when the input signal exceeds the decoded signal and "off" when it fails to reach this amplitude.

At the output side of the local decoding network, the decoded wave increases by one quantizing unit $\Delta$ when the pulse is "on," while the wave lowers by one quantizing unit $\Delta$ when the pulse is "off," whereby the decoded wave follows up to the input signal within the error range $\pm\Delta$. Thus the pulse is encoded depending on whether the error signal or the incremental difference is positive or negative. At the receiving terminal, by demodulating the coded pulse with an integrating circuit having the same characteristics as the decoding circuit in the modulating terminal encoder after said coded pulses have been shaped in order to eliminate the distortion and noise in the transmission line, substantially flat transmission characteristics are available.

To assure this result, it is a necessary condition that the output of the binary shaping or monostable circuit 3 is stabilized both in pulse height and pulse width. If these values vary with the coded pulse sequence, the quantizing noise in the received decoded signal will be increased. The discriminating resolution $\delta E$ at the input of 3 should be as small as practicable, otherwise erroneous encoding may result and the quantizing noise at the receiving side will be increased. Therefore the quantizing unit $\Delta$ must be taken large comparing with $\delta E$ and the resolution with respect to the time and input voltage of the circuit 3 must be made favorable.

Generally, the simpler the construction of the circuit is, the more deteriorated these factors are likely to be. As a result, such means as use of a coupling network such as a buffer amplifier is resorted to.

The delta modulation equipment according to the present invention provides an encoder, excelled in the above-mentioned characteristics, with the simplest circuit construction i.e. constituting a feedback loop from one of the collectors (or anode) of a pair of transistors (or vacuum tubes) in the monostable circuit to one of the bases (or grid) via an integrating circuit, a signal input transformer, a pulse coupling transformer, and a diode.

Now a description of an embodiment of the invention will be made referring to FIG. 2.

This figure is an embodiment of delta modulation equipment using a known collector-coupled monostable multivibrator employing transistors $Tr_1$ and $Tr_2$ in the monostable circuit as a binary shaping circuit. The collector-coupled monostable multivibrator can be so constructed that the pulse width is determined by $C_T$ and $R_T$, sufficient time resolution being provided by suitably selecting transistors and time constants, whereby both the pulse width and the voltage are substantially free from change by the coded pulse sequence. Further, the voltage discrimination resolution when said multivibrator is triggered to the base is exceedingly good, enabling a discrimination of the trigger voltage difference to be performed at levels as low as several millivolts.

Figure 3:
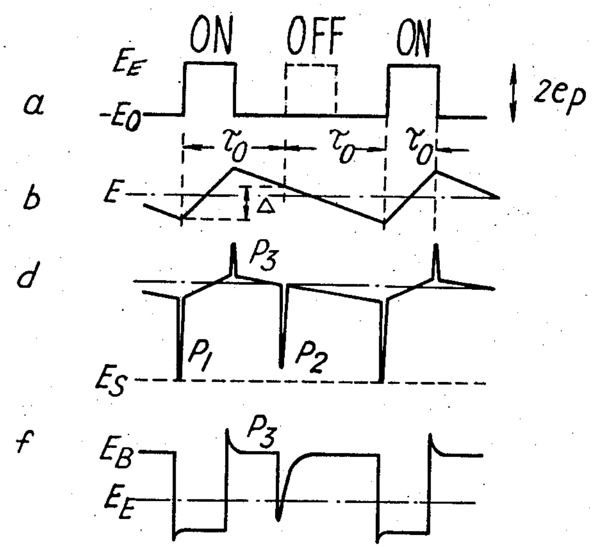
FIG. 3 shows the waveforms at various portions in the circuit.

By integrating or decoding the rectangular pulse, as shown at (*a*) in FIG. 3, produced at the collector of the transistor $Tr_1$ in the monostable circuit by the integrating resistance $R_1$ and the integrating capacitor $C_1$, a triangular wave as shown at (*b*) in FIG. 3 appears at point *b*. This waveform, or the local decoded wave produced at juncture *b*, follows the input signal. Since a passive RC integrating circuit is used as a local decoder, linearity is excellent. A negative feedback loop from the collector of $Tr_1$ to the base in the monostable circuit is provided by connecting coupling transformer $T_1$, pulse coupling transformer $T_2$, and a diode D to the integrating circuit in series. The input signal $e_1$ and the negative sampling pulse $e_2$ are applied to the circuit through transformers $T_1$ and $T_2$, respectively. A difference signal between the modulating input and the waveform integrated and decoded by $C_1$ and $R_1$ appears at point *c*.

Since the on-off code is repeated when unmodulated, the monostable multivibrator operates into its "on" and "off" state successively by the successively applied trigger pulses with the result that the waveform as indicated at (*b*) in FIG. 3 appears at point (*b*). If it is considered that the feedback loop following the integrating circuit is open, the D.C. potential E in the waveform (*b*) is the mean of the waveform (*a*). Therefore we have $$|E|=E_o+\frac{\tau_p}{\tau_o}ep \qquad (1)$$

where $\tau_p$ is the pulse width, $\tau_o$ is the sampling period, $Eo$ is the voltage of power supply, and *ep* is the coded pulse voltage.

The stability of the delta modulating circuit is enhanced by feeding back the D.C. component. Since the value of E in Equation 1 is at a negative potential with respect to the base operating potential $Es$ of the monostable circuit, a D.C. coupling circuit network has generally been used in such a case to adjust the potential for closing the feedback loop. With the modulating equipment according to the present invention, the conventional D.C. coupling network can be dispensed with by constructing a feedback loop by connecting directly an integrating circuit, a negative sampling pulse source $e_2$, and a diode D in series.

In other words, when the monostable circuit is inoperative $T_{22}$ is in "on" condition with the result that the base of $T_{21}$ is biased to positive with respect to the emitter potential as shown at *f* in FIG. 3. Since the potential at point *d* is clamped to the base potential $E_B$ by the diode in this case, the integrating condenser $C_1$ is charged to this potential with the result that the potential is raised higher than the potential E in Equation 1. Assume now the next trigger pulse is applied to the circuit. Under normal operation one coded pulse is produced for each two trigger pulses when no input wave is present, the negative sampling pulse is superposed on the difference signal *c* with the result that the waveform as shown at (*d*) in FIG. 3 appears, the base of $T_{21}$ being triggered through the diode. Thus the monostable circuit will be triggered into its "on" condition only by $P_1$ and $P_2$ as shown in curve *f*. Where the pulse is produced at this steady state, overshoot $P_3$ occurs at the trailing edge of the pulse at point *f*. The diode becomes conducting at the intervals where $P_1$, $P_2$, are produced, condenser $C_1$ being charged during this interval and the potential increased to a certain extent from $E_B$, thus reaching the steady state. Therefore the feedback loop can be closed without using the D.C. coupling network by charging $C_1$ through the diode. This steady state can be adjusted by varying the base potential $E_B$ or sampling pulse $e_2$, etc.

On the other hand, it is not desirable that the time constant $\tau_1=C_1\cdot R_1$ is affected by the non-linearity of other active circuits since the transmission characteristics of the delta modulation system depend on this value.

The magnitude of the quantizing unit is expressed by $$\Delta=\frac{1}{C_1\cdot R_1}ep\cdot\tau_p \qquad (2)$$

It is desirable to take $\Delta$ as large as possible with respect to the discrimination resolution $\delta E$ of the monostable circuit. Therefore *ep* is taken from the collector. By taking $\tau_p$ as large as possible within the limit permitted by the time resolution, $\Delta$ becomes of the order of several times ten millivolts under suitable conditions, which is large as compared with $\delta E$ which is less than several millivolts, sufficient operation being performed. Although a buffer amplifier, etc. may be used for coupling to the monostable circuit, in order to lessen the loading effect of the monostable circuit, the effect of nonlinearity, in this case, can be ignored by lowering the impedance of the integrating circuit compared with the trigger input impedance of the monostable circuit.

Figure 4:
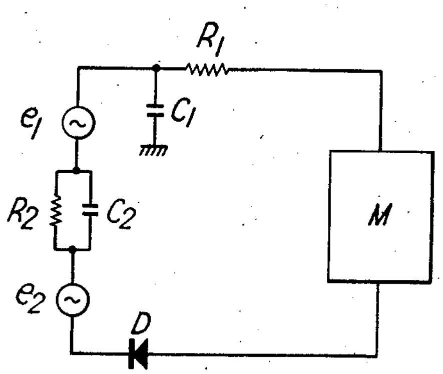
FIG. 4 shows the construction of a modified feature of the present invention.

The conduction time intervals for the diode are $P_1$, $P_2$, and $P_3$ are narrow enough as shown at (*d*) in FIG. 3 with the result that the effective trigger input impedance is appreciably high. In the absence of a buffer amplifier in the equipment, however, the non-linearity of the diode, etc. may affect the following characteristics suitable for the performance. Although less noise will be introduced by making $C_1$ large ($\tau_1=R_1\cdot C_1$=constant) and lowering the integrating impedance, the current flowing through the diode will then be increased because $R_1$ is small, and the conduction time intervals of the diode will become larger than the intervals $P_1$, $P_2$ and $P_3$ previously mentioned. This lowers the effective trigger input impedance and decreases the quantizing unit $\Delta$. These are detrimental in obtaining favorable characteristics because non-linearity affects the integrating circuit for determining the transmission characteristics. In such a case, a shunt network $R_2$, $C_2$ should be inserted at point *b*, *c*, or *d* in FIG. 2, construction being as shown in FIG. 4.

In this case, the current flowing through D is decreased by taking $R_2$ large, even if $R_1$ may be small with the result that charging due to pulses $P_1$, $P_2$, and $P_3$ in FIG. 3 is mainly given to $C_2$, the D.C. potential at point *b* becoming close to the value shown in Equation 1. Thus the effect of the non-linearities by the diode, etc. with respect to the quantizing unit $\Delta$ becomes smaller. Further, since $C_2\cdot R_2$ is selected in such a manner that $\tau_2=C_2\cdot R_2>>\tau_1$, it is possible to make the linearity favorable without affecting the modulation characteristics within the transmission bandwidth.

Where the above-mentioned effects are negligible, $C_2$ and $R_2$ are dispensed with. Since the circuits $e_1$, $e_2$, D, $R_2$, and $C_2$ are connected in series, it is evident that this sequence can be changed freely. Although description has been made referring to a D.C. coupled circuit, it will be evident that pulses $P_1$, $P_2$, and $P_3$ are charged on C even if the lower end of $R_2$ ($e_2$ side) of the $C_2\cdot R_2$ circuit of FIG. 4 is left as it is and the upper end (*e* side) connection is removed and grounded so as to constitute and A.C.-coupled, RC circuit, the trigger action being maintained at the optimum level in the same manner as mentioned previously. A sufficiently stable circuit is available by suitably selecting $R_2$ and $C_2$. Such a circuit is shown in FIG. 4*a*.

Although a collector-coupled monostable multivibrator has been described as a monostable circuit in explaining the above-mentioned embodiment, it will be evident that any of a suitably adjusted emitter-coupled monostable multivibrator, a point-contact transistor monostable multivibrator, or a monostable blocking oscillator can be used.

Although the simplest example has been shown due to simple RC integration as a local decoder, an integrating circuit provided with further complex transmission characteristic may be used.

As has been fully described above, the equipment according to the present invention is constructed with a minimum number of component parts without using complex circuits such as a D.C. coupling network or the buffer amplifier by forming a direct coupled feedback loop with a monostable circuit, integrating circuit, input coupling transformer, pulse coupling transformer, and a diode connected in series to give excellent modulation characteristics in spite of the simplicity of the circuit construction.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A delta modulation circuit for digitalizing an analogue signal into a one digit binary code comprising in combination a monostable circuit having a trigger pulse input terminal and two output terminals one of which acts as the output for the delta modulation circuit, a decoding circuit connected to the other output terminal of said monostable circuit and a series circuit connected between said decoding circuit and said trigger pulse input terminal comprising a signal input transformer secondary winding the primary winding of which serves as the input for the analogue signal, a sampling pulse transformer secondary winding the primary winding of which serves as the input for sampling pulses and a diode.

2. A delta modulation circuit as claimed in claim 1 in which said decoding circuit consists of an RC integrating network.

3. A delta modulation circuit as claimed in claim 2 in which said monostable circuit comprises two transistors and an RC network coupled therebetween for determining the pulse width.

4. A delta modulation circuit as claimed in claim 1 further comprising a resistor and capacitor in parallel connected in series in the said series circuit.

5. A delta modulation circuit as claimed in claim 4 in which the decoding circuit consists of an RC integrating network, the time constant of said parallel circuit being much greater than that of said RC integrating network.

6. A delta modulation circuits as claimed in claim 1 further comprising a capacitor connected in series between the secondary windings of the two transformers and a resistor connected between ground and the junction of said capacitor and the secondary winding of the sampling pulse transformer.

References Cited in the file of this patent

UNITED STATES PATENTS

| | | |
|---|---|---|
| 2,803,702 | Ville et al. | Aug. 20, 1957 |
| 2,816,267 | Jager et al. | Dec. 10, 1957 |
| 2,822,522 | Price | Feb. 4, 1958 |

OTHER REFERENCES

Electronic Engineering, February 1956, pages 48–52.